United States Patent [19]

Stephenson

[11] 4,209,150
[45] Jun. 24, 1980

[54] WING-MOUNTED AIRCRAFT UTILITY DOORSTOP

[76] Inventor: William J. Stephenson, 2165 44th Ave., Vero Beach, Fla. 32960

[21] Appl. No.: 930,245

[22] Filed: Aug. 2, 1978

[51] Int. Cl.² .............................................. B64C 1/00
[52] U.S. Cl. ............................... 244/129.1; D8/402; D12/81; 16/82
[58] Field of Search .................. 244/1 R, 129.1, 129.4, 244/129.5; 16/82, 86 R, 86 A; D8/402; D12/81

[56] References Cited

U.S. PATENT DOCUMENTS

| D. 86,677 | 4/1932 | Johnson | D8/402 |
| D. 194,451 | 1/1963 | Morgan | D8/402 |
| 1,929,623 | 10/1933 | Chisling | 16/86 A |

FOREIGN PATENT DOCUMENTS 656971 9/1951 United Kingdom ................. 244/129.4

OTHER PUBLICATIONS

Jane's All the World's Aircraft, 1972-1973 Edition, p. 401, "Piper PA-28-200 Cherokee Arrow II".

*Primary Examiner*—Charles E. Frankfort
*Attorney, Agent, or Firm*—Richard Dixon

[57] ABSTRACT

The present invention relates to a doorstop specifically adapted to be attached to the wing of an aircraft in a position for communicating with and limiting the opening arc of a door of the aircraft. The doorstop includes a base for coupling to the wing of the aircraft and an upstanding blade having one end coupled to the base and a second end distending therefrom. The smallest width dimension of the blade is oriented perpendicular to the chord of the aircraft wing. A resilient buffer is coupled to the second end of the upstanding blade so as to communicate with and limit the opening arc of the aircraft door.

18 Claims, 6 Drawing Figures

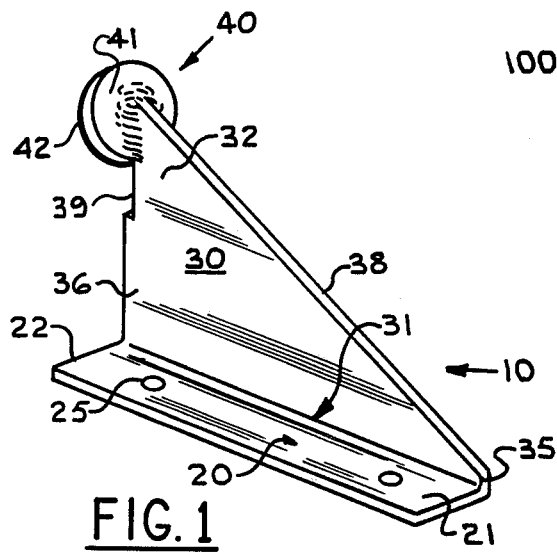
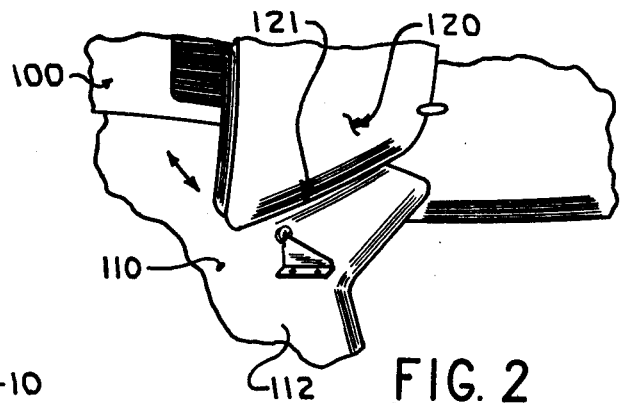
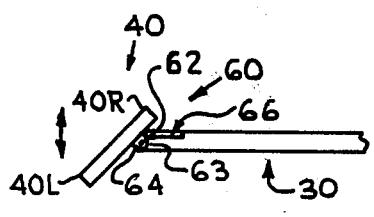
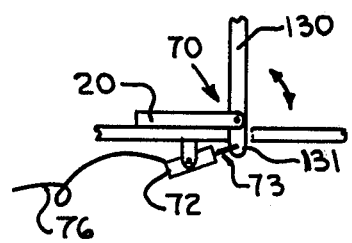
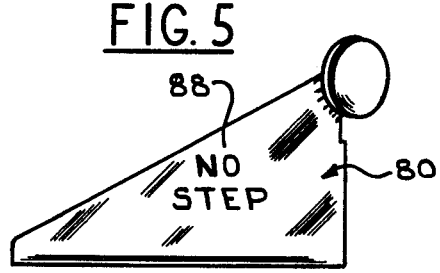
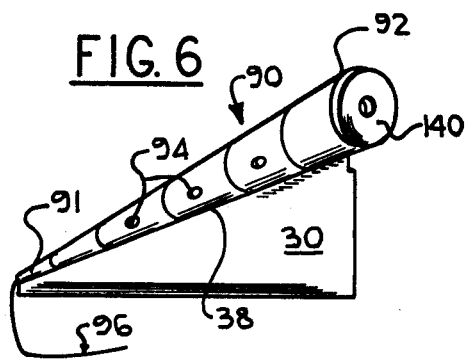

WING-MOUNTED AIRCRAFT UTILITY DOORSTOP

BACKGROUND OF THE INVENTION

I. Field of the Invention

The present invention relates to accessories for light aircraft, and in particular to a unique and highly efficient design for a wing-mounted doorstop for limiting the opening of the aircraft door. Various embodiments of the invention include the capabilities of generating smoke for illustrating the laminar flow of air over the aircraft wing, for acting as a radar reflector, and for automatically folding from an extended position to a position of lower drag resistance.

II. Description of the Prior Art

Aircraft manufacturers have commonly included a door-stopping mechanism within the hinge of doors installed on light aircraft. These hinges are typically satisfactory for normal operation, but prove highly unsatisfactory during heavy commercial or training utilization. Also, during conditions of inclement weather any high-speed winds coming from the aft section of the aircraft will tend to cause the door to act as a sail and to automatically open. It is not unusual for the force of these winds to completely break or disengage the normal door limit device. When this failure mode occurs, the door continues its rotation on its hinges until the external doorknob or opening mechanism communicates with a section of the fuselage adjacent the engine cowling. Typically the doorknob or opening mechanism is completely thrust through or at least severely dents the sheet metal of the engine cowling. Repair of these damages often exceeds $100 to the aircraft fuselage and $20 for the repair of the door hinge. It is also not unusual for the same incident to recur shortly after the repairs have been completed, since the repairs do not eliminate the original problem, but instead merely correct the symptoms of the problem.

The present inventor is the owner and manager of a fixed base operation which employs a large number of low-wing aircraft which are utilized for the instruction of student pilots. After several years of continuous repairs to the fleet of light aircraft, and after repeatedly repairing the same damage to the same aircraft, the present inventor recognized the design faults of the hinge-positioned doorstop and further recognized that an outboard doorstop would be required. The present invention has conducted an extensive search of presently available devices for satisfying these requirements, but has been unable to discover any satisfactory devices or solutions. The present inventor has also conducted a search for previously patented devices which would provide a solution to this problem, and the following references are provided as illustrative of the devices located.

U.S. Pat. Nos. Des. 86,677 issued to Johnson and 194,451 issued to Morgan disclose designs for doorstops of the types utilized in homes and offices for limiting the angular opening of typical wooden or metal doors. Both of these designs utilize heavy construction and bulky elements which are not suitable for use on aircraft since the size and design of the doorstops would significantly increase the drag and disturb the laminar flow of air over the wing when the aircraft is flying.

Hagstrom, in U.S. Pat. No. 2,432,150, discloses a normal doorstop which includes a movable head which is pivoted about an angular rotational face. The head is adapted to engage the opening door in a variety of different physical orientations. Taylor, in U.S. Pat. No. 2,454,414, discloses another doorstop which includes at one end thereof a screw-type device for being fastened to the wall and includes at the other end thereof a suction cup which is movably mounted to the frame of the doorstop in order to allow the suction cup to pivot for communicating normally with the door.

In addition to the above references the inventor has also located and examined the following U.S. patents which were deemed to add little if anything to the previously discussed references: U.S. Pat. Nos. 2,682,683, 2,809,061, 2,189,048, 2,121,766, 1,044,412, 890,701.

The above references were located in the following classes/subclasses (among others): 244/129.4, 129.5; 16/82, 83, 84, 86R, 86A, and 49; 292/238; and D8/402.

SUMMARY OF THE INVENTION

The present invention is related to a doorstop adapted to be attached to the wing of an aircraft in a position for communicating with and limiting the opening arc of a door of the aircraft. The doorstop includes a base plate for congruently coupling with an adjacent surface of the aircraft wing. A distended blade is coupled at a first end thereof to the base plate, with a second end of the blade being spaced from the wing by a distance substantially sufficient to communicate with the aircraft door as it swings open. The blades includes a relatively thin, planar body section bounded by a leading edge and a trailing edge which define therebetween a longitudinal axis of the blade which is oriented generally parallel with a chord of the aircraft wing. A buffer is coupled to the second end of the distended blade so as to communicate with and limit the opening arc of the aircraft door.

BRIEF DESCRIPTION OF THE DRAWINGS

Other objects, features and advantages of the present invention will be apparent through a careful study of the written description and the drawings in which:

FIG. 1 illustrates a frontal perspective view of a first preferred embodiment of the wing-mounted aircraft utility doorstop in accordance with the teachings of the present invention.

FIG. 2 illustrates a side perspective view of the first preferred embodiment of the wing-mounted aircraft utility doorstop as attached to the upper surface of a low-winged aircraft.

FIG. 3 illustrates a partial top view of a second preferred embodiment of the wing-mounted aircraft utility doorstop.

FIG. 4 illustrates a frontal elevation of a third preferred embodiment of the present invention as mounted on the top surface of an aircraft wing.

FIG. 5 illustrates a side elevational view of a further preferred embodiment of the present invention which utilizes an optically reflecting surface which may be marked with a visual message.

FIG. 6 illustrates a side perspective view of another preferred embodiment of the present invention which employs a cone-shaped receptacle having a cavity therein for receiving chemicals for being activated to produce smoke or the like.

DESCRIPTION OF THE PREFERRED EMBODIMENT

A first preferred embodiment of the wing-mounted aircraft utility doorstop in accordance with the present invention is shown generally as 10 in FIG. 1. It should be noted that the first preferred embodiment of the present invention is specifically designed to be utilized with aircraft manufactured by Piper Aircraft Corporation bearing the model names and nomenclatures Cherokee 140, 151, 161, 180, 235, 181, and 160 as well as the Arrow 180, 200, 3 and 201P. Various other adaptations of the invention may be required in order to suit the specific design requirements of a particular aircraft, but the general elements and functional cooperation of those elements will remain essentially the same in all similar embodiments. While the first preferred embodiment of the invention has been illustrated in FIGS. 1 and 2 as being attached to the upper surface of an aircraft wing, it will be apparent that the same unit can also be attached to the lower surface of a high-winged aircraft, such as the various models of light aircraft produced by the Cessna Aircraft Company.

The doorstop 10 includes a base, shown generally as 20 in FIG. 1, which includes a front end 21 and a rear end 22 thereof. The base 20 is generally planar in order to congruently couple with an upper surface 112 of the wing 110 of an aircraft 100 as shown in FIG. 2. However, it may be advisable to manufacture the base 20 with an arcuate or slightly bowed shape in order to congruently couple with the upper surface of a wing which is not substantially planar over the section which is coupled to the doorstop 10. The base 20 is coupled to the upper wing surface 112 by a first screw which communicates through a first aperature 24 in the base 20 and a second screw which communicates through a second aperature 25 in the base 20. The distance between the aperatures 24 and 25 is approximately 3.5 inches so as to be in alignment with existing screw holes in the upper surface 112 of the aircraft wing 110. In this manner no substantial modifications will be required to attach the doorstop 10 to the wing 110 of the aircraft, and no FAA inspections or modification packages need be prepared following the installation of this item.

It should also be noted that the base 20 of the doorstop 10 could be mounted on the planar surface of a closure cap of the type used to seal a gasoline tank mounted within the wing of an aircraft, such as the Beechcraft Musketeer series of light aircraft (not illustrated). In this case the doorstop 10 could serve as a handle for being grasped by the pilot or ground maintenance personnel in order to obtain access to the fuel tank.

An upstanding blade 30 includes a first end or lower end 31 which is attached to the base 20, and a second or distended end 32 which is spaced therefrom by a distance which is sufficient to assure that the second end 32 is in close proximity with a lower edge 121 of the aircraft door 120 as it opens in its characteristic rotary or arcshaped fashion. It should be noted that it may be advantageous to allow the lower surface 121 of the aircraft door 120 to communicate over the second end 32 of the upstanding blade 30 in order that all communication with the aircraft door 120 will be handled by a buffer 40 coupled to the second end 32 of the upstanding blade 30.

The first preferred embodiment of the blade 20 is approximately 2 inches in height as measured from the first end 31 to the second end 32 thereof. The length of the blade 30 is approximately 3.5 inches as measured between a leading edge 35 and a trailing edge 36 thereof. The thickness of the blade 30 is approximately 0.125 inches in order to present minimum drag resistance when the aircraft is flying. The use of a blade, a thin airfoil or other design having a small frontal area for minimum drag is critical to the acceptable performance of the present invention.

A distended surface 38 (or upper surface) of the blade 30, which is generally adjacent to the second end 32 thereof, is cut at an acute angle with respect to a longitudinal axis of the upstanding blade 30 (typically parallel with the base 20). The distended surface 38 communicates between a relatively short leading edge 35 and a relatively long trailing edge 36. This sloping distended surface 38 of the upstanding blade 30 provides a small decrease in the drag resistance as the aircraft is flying. This configuration also assures that no extremely sharp edges are exposed to injure nearby personnel, and also serves as an economical alternative in the manufacturing process of the doorstop 10. The longitudinal axis of the upstanding blade 30 is generally aligned with a chord (not shown) of the aircraft wing so as to obtain substantially equal flow of air bypassed on either side thereof.

While the first preferred embodiment of the present invention illustrates the first end 31 of the upstanding blade 30 as attached to one edge section of the base 20, the first end 31 may be coupled to the base 20 along a center line or another edge thereof as is dictated by other design, manufacturing or installation considerations. The construction of the present embodiment has been chosen so that the base 20 and the upstanding blade 30 may be fabricated from a single piece of 5052-H32 sheet aluminum which is then bent at an approximate 90-degree angle in order to form the demarcation line between the base 20 and the upstanding blade 30. Since the buffer 40 may not communicate precisely with the lower edge 121 of the aircraft door 120, a shallow notch 39 is provided in the trailing edge 36 of the blade 30 in order to receive the lower section of the aircraft door. The exact dimensions and locations of this notch 39 may be modified to suit the specific requirements of the aircraft onto which the doorstop 10 is to be affixed.

A buffer, shown generally as 40 in FIG. 1, is welded to the second end 32 of the upstanding blade 30 generally adjacent to the intersection of the distended surface 38 and the trailing edge 36. In the first preferred embodiment the buffer 40 includes a metal bumper plate which is attached to the second end 32 of the blade 30, and a resilient pad 42 which is secured to the aft or exposed surface of the bumper plate 41. The type of material and the thickness of the resilient pad 42 are generally determined such that the most severe communication between the doorstop 10 and the aircraft door 120 will not cause any dents or other structural damage adjacent the lower edge 121 of the aircraft door 120.

In the first preferred embodiment of the present invention the plane of the bumper plate 41 is not perpendicular or normal to any of the longitudinal or vertical dimensions of the blade 30, but instead faces slightly downwardly and inwardly toward the fuselage of the aircraft as viewed generally in FIG. 2. This orientation is required in order that the plane of the resilient pad 42 and the bumper plate 41 communicates generally parallel with the lower surface 121 of the aircraft door 120, in as much as the base 20 of the doorstop 10 slopes downwardly in the front thereof due to the downward curvature of the section of the upper surface 112 adjacent the leading edge of the wing 110.

A portion of a second preferred embodiment of the present invention is illustrated in FIG. 3 as including a hinge, shown generally as 60, which movably couples the buffer 40 to the blade 30. The hinge 60 includes a first element 64 which is attached to the buffer 40 and a second element 63 which is either attached to or manufactured as part of the blade 30. These two elements are movably coupled together by the operation of a hinge pin 62. It should be observed that the hinge element 64 is offset toward one side or edge of the buffer 40 in order that air pressure on the left side 40L will be greater than the air pressure on the right side 40R of the buffer 40. This causes the rotation of the buffer 40 about the hinge pin 62 such that the right side 40R of the buffer 40 communicates adjacent the blade 30 while the left side 40L moves outwardly in a manner generally parallel to but spaced from the blade 30. A small notch 66 is cut into one side of the blade 30 so as to receive therein the right side 40R of the buffer 40 in order to minimize the effective air resistance or drag produced by the bumper 10 as the aircraft is flying.

FIG. 4 illustrates a portion of a third preferred embodiment of the present invention in which the upstanding blade 130 is movably coupled to the base 20 about another hinge 70 which has an axis of rotation generally parallel with the plane of the base 20. In this third preferred embodiment a first end 131 of the blade 130 projects slightly below the plane of the base 20 in order to couple with a movable rod 73 actuated by an electrical solenoid 72. In this manner when electrical energy is applied to the solenoid 72 through a cable 76, the movable rod 73 will extend outwardly causing the blade 130 to rotate in a counterclockwise direction about the hinge 70 so as to fold the generally upstanding blade 130 generally parallel to the base 20. This will substantially reduce the drag or air resistance induced by the doorstop 10. It should be noted that this third preferred embodiment requires that the space immediately below the base 20 within the wing 110 be evacuated so as to provide space for the solenoid 72. It should also be appreciated that other equivalent actuating means may be provided in order to rotate the upstanding blade 130 about the hinge 70. Also, the actuating means may be triggered or operated by other functions of the aircraft, such as the extension of landing gear, etc. In this manner the operative portion of the doorstop 10 will be extended above the upper surface 112 of the aircraft wing 110 only when the aircraft landing gear has been extended, such as during the approach to landing, or taxiing or parking on the ground.

It should be apparent that the presence of the upstanding blade 30 which projects above the upper surface 112 of the aircraft wing 110 presents a unique opportunity for attaching other useful but related accessories to the aircraft. In this regard the present invention has been designed to act as a half-wave radio reflector at the frequencies normally used by aircraft control radar systems. It will be appreciated by one skilled in the art that by providing a resonant half-wave element at a point spaced from the typical surfaces of the aircraft fuselage, the incident radar signals may be reflected back to the radar with somewhat increased efficiency. While it may be possible to adjust the various dimensions of the upstanding blade 30 to achieve this end, the first preferred embodiment of the present invention has been designed such that the diameter of the bumper plate 41 is approximately a multiple of one-half of an electrical wave length at approximately 9340 MHz. It may be desirable to furnish a separate horizontally oriented wing-shaped resonant dipole (not shown) located at the distended end of the blade in order that the size of the bumper plate may be adjusted for other considerations.

A fourth preferred embodiment of the present invention is illustrated in FIG. 5 as including an optically reflective surface 80 on the side of the upstanding blade 30 which is visible from the passengers' compartment of the aircraft fuselage 100. Typically this optically reflective surface 80 is nearly planar so as to not substantially distort the images reflected therefrom. With reference to FIG. 2, it will be noticed that the occupant of the right-front seat of the aircraft cabin can easily view the optically reflective surface 80 which can be oriented so as to display the cowling or front section of the aircraft fuselage 100. This outside visibility is often critical in assessing a possible oil or fuel leak which can be ascertained by visual sightings of oil, fuel or exhaust leaking from the junction of skin elements forming the aircraft skin.

A fifth preferred embodiment of the present invention also is illustrated in FIG. 5 as including a plurality of alpha-numeric elements 88 which are located on the surface of the upstanding blade 30 that is visible from the passenger compartment of the aircraft 100. In this manner cautionary or instructional messages may be displayed to aircraft passengers prior to the passengers entering or departing from the aircraft 100. These alpha-numeric elements 88 may be applied to a nonreflective surface, or in the alternative may be applied directly over the optically reflective surface of the fourth preferred embodiment. It will be appreciated that various messages may be visually displayed on either side of the upstanding blade 30.

A sixth preferred embodiment is illustrated in FIG. 6 as including a cone-shaped vessel 90 which is attached to the distended surface 38 of the upstanding blade 30. A pointed or first end 91 thereof is adjacent the leading edge 35 and a larger diameter end 92 is adjacent the trailing edge 36 of the blade 30. The conical vessel 90 defines therein a reservoir which is coupled to the outside air by a plurality of aperatures or bores 94 which communicate through the external surface of the conical vessel 90. A buffer 140 is removably attached to the second end 92 of the conical vessel 90 in order to close the reservoir therewithin. The reservoir is typically adapted to receive and store dry chemicals of the type used for producing smoke. An electrical circuit, shown generally as 96, may be provided in order to activate the chemicals so that the pilot may cause smoke to be generating within the reservoir. As the smoke escapes through the aperatures 94, the prevailing air movement over the surface of the wing 110 will carry the smoke in the aft direction.

The flow of this smoke may be useful in displaying the phenomenon known as "laminar flow" of the air over the aircraft wing for various angles of attack, or it may be used to accentuate the movements of the aircraft from the ground as during demonstration or stunt flying. It will be appreciated that other means of producing smoke may be substituted for the chemical and electrical actuation system as illustrated herein. For example, smoke producing petroleum products may be injected into the exhaust manifold of the engine so as to produce smoke which may be vented through tubing or pipes which are routed through the wings in order to exit through the apertures 94 in the conical vessel 90.

Various other accessories may be attached to the upstanding blade 30. One example would be the use of a source of illumination for lighting the side or tail section of the aircraft, either for safety purposes or for purely aesthetic reasons. By properly insulating the base 20 and/or the upstanding blade 30 from the adjacent upper surface 112 of the aircraft wing 110, it may be possible to utilize the upstanding blade 30 as an antenna or radiating element for communications or navigation equipment located within the aircraft.

Thus, a plurality of preferred embodiments of the wing-mounted aircraft utility doorstop have been described as examples of the invention as claimed. However, the present invention should not be limited in its application to the details and constructions illustrated in the accompanying drawings and the specification, since this invention may be practiced or constructed in a variety of other different embodiments. Also, it must be understood that the terminology and descriptions employed herein are used solely for the purpose of describing the preferred embodiments, and should not be construed as limitations on the operability or specific construction of the invention in general.

I claim:

1. A doorstop adapted to be attached to the wing of an aircraft in a position for communicating with and limiting the opening arc of a door of the aircraft, said doorstop comprising in combination:
    a base for coupling to the wing of the aircraft;
    an upstanding blade having a first end thereof coupled to said base and a second end thereof spaced from the wing by a distance sufficient to communicate with the aircraft door as it swings open, said blade having a thin dimension oriented generally perpendicular to a chord of the wing;
    buffer means coupled to said second end of said upstanding blade so as to comminicate with and limit the opening arc of the aircraft door; and
    folding means, operably interposed between said buffer means and said upstanding blade, for allowing said buffer means to fold into a position generally parallel with the flow of air across the aircraft wing.

2. The aircraft doorstop as described in claim 1 wherein said base comprises a plate for congruently coupling with an adjacent surface of the aircraft wing.

3. The aircraft doorstop as described in claim 2 wherein said plate includes at least two bores therein, which are spaced approximately 3.5 inches apart, for receiving therethrough screws which attach said plate to the surface of the wing.

4. The aircraft doorstop as described in claim 2 wherein said plate comprises part of a cap for sealing a wing access aperture leading to the internal wing fuel tank.

5. The aircraft doorstop as described in claim 2 wherein said plate is movably coupled to said blade, and further including
    reactor means for folding said blade from the upstanding position into a position of lower drag profile, thereby reducing the drag induced by said doorstop when the aircraft is flying.

6. The aircraft doorstop as described in claim 5 wherein said reactor means comprises an electrically actuated solenoid having an extendable portion thereof operably coupled to said blade.

7. The aircraft doorstop as described in claim 1 wherein said buffer means comprises in combination:
    a bumper plate operably coupled to said second end of said plate; and
    a resilient pad coupled to said bumper plate for cushioning the communication between said buffer means and the aircraft door.

8. The aircraft doorstop as described in claim 7 wherein said blade includes a relatively long and thin body section having a leading edge and a trailing edge which define therebetween a longitudinal axis which lies in a plane generally parallel with a chord of the aircraft wing.

9. The aircraft doorstop as described in claim 8 wherein the side of said body section facing the fuselage of the aircraft includes thereon an optically reflective surface for allowing an occupant of the aircraft to view the engine and cowling section of the aircraft as reflected from said body section.

10. The aircraft doorstop as described in claim 8 wherein said body section facing the fuselage of the aircraft includes thereon elements comprising alphanumeric symbols of the type conveying a visual image to the occupants of the aircrafts.

11. The aircraft doorstop as described in claim 8 wherein a distended edge of said body section of said blade is angled with respect to said longitudinal axis from a relatively short dimension of said leading edge to a relatively long dimension of said trailing edge.

12. The aircraft doorstop as described in claim 1 wherein said blade is electrically conductive and is shaped so as to represent, along at least one outside dimension thereof, a multiple of one-quarter electrical wavelength at approximately 9340 MHz, whereby said blade acts as a resonant target and reradiator for aircraft radar signals.

13. The aircraft doorstop as described in claim 1 further including:
    a reservoir, attached to a distended end of said blade, for storing therein smoke producing chemicals, with said reservoir including at least one aperture therethrough for allowing the escape of the smoke; and
    electrical actuating means communicating into said reservoir for actuating the chemicals therein in order to produce smoke, whereby the smoke can exist through said apertures and flow out over the wing in order to demonstrate laminar air flow.

14. The aircraft doorstop as described in claim 13 wherein said reservoir is defined as a void within a cone-shaped vessel attached to said distended end of said blade, with a point of said cone-shaped vessel being adjacent to said leading edge of said blade.

15. A doorstop adapted to be attached to the wing of an aircraft in a position for communicating with and limiting the opening arc of the door of the aircraft, said doorstop comprising in combination:
    a base plate for congruently coupling with an adjacent surface of the aircraft wing;
    a distended blade having a first end thereof coupled to said base plate and a second end thereof spaced from the wing by a distance substantially sufficient to communicate with the aircraft door as it swings open, said blade including a relatively thin, planar body section having a leading edge and a trailing edge which define therebetween a longitudinal axis which is oriented generally parallel with a chord of the aircraft wing;

buffer means coupled to said second end of said distended blade so as to communicate with and limit the opening arc of the aircraft door; and reactor means for folding said blade from the upstanding position into a position of lower drag profile, thereby reducing the drag induced by the doorstop when the aircraft is flying.

16. The aircraft doorstop as described in claim 15 wherein:

said leading edge is relatively short and said trailing edge is relatively long, and with said second end of said planar body section communicating therebetween at an acute angle with respect to said longitudinal axis of said distended blade; and wherein said buffer means comprises in combination a buffer plate operably coupled to said second end of said distended blade, and a resilient pad coupled to said bumper plate for cushioning the communication between said buffer means and the aircraft door.

17. The aircraft doorstop as described in claim 15 wherein the effective frontal width of said blade is less than 0.25 inches.

18. The aircraft doorstop as described in claim 15 wherein said blade is shaped as a vertical airfoil.

* * * * *